Patented Dec. 28, 1937

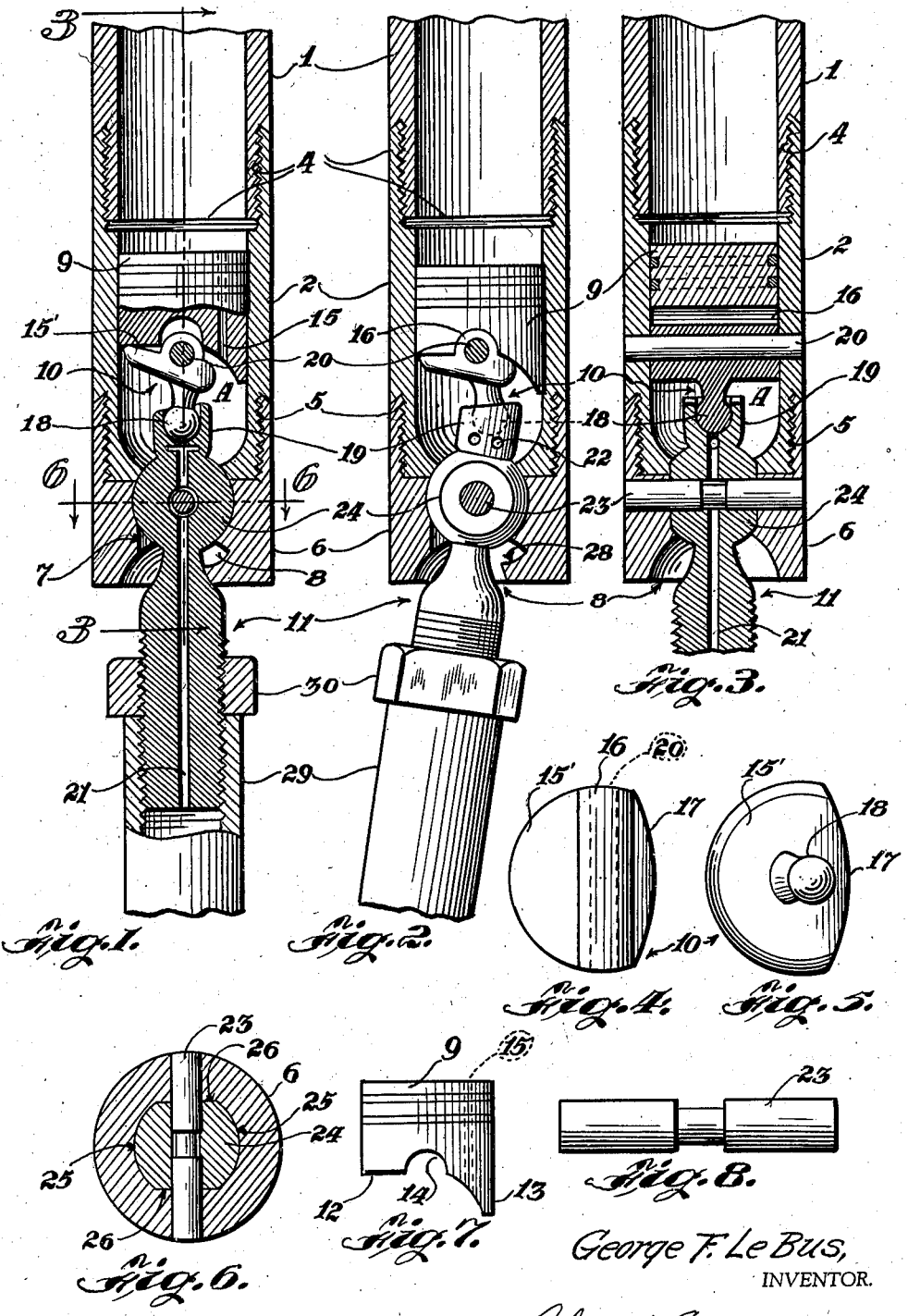

2,103,988

UNITED STATES PATENT OFFICE 2,103,988

FISHING TOOL FOR WELL DRILLING

George F. Le Bus, Longview, Tex.

Application May 16, 1936, Serial No. 80,053

2 Claims. (Cl. 294—86)

My invention relates to improvements in fishing tools used in well drilling, but particularly to means for enabling a well fishing tool to more effectually locate and get hold of lost tools or cable in the well.

In this connection, the particular object of my invention is to provide a means, which I term a knuckle-joint and which, when connected between the drill stem and a fishing tool, enables the fishing tool to be moved from a vertical position to an oblique position with respect to the hole being drilled, so as to move the fishing tool into a pocket into which the lost tool or other object may have dropped. This movement is effected by water pressure on a piston which forms a part of my invention and enables the tool to be much more effectual in locating and getting hold of the object to be removed from the well.

My invention will be clearly understood from a perusal of the following detailed description, taken in connection with the accompanying drawing, and wherein:

Figure 1 is a vertical sectional view through one end of a drill stem and one end of a fishing tool and embodying my invention, Figure 2 is a view similar to Figure 1, but illustrating the knuckle joint moved to an oblique position, pressure being applied to the piston.

Figure 3 is a transverse vertical sectional view of Figure 1, the view being taken on the line 3—3 of Figure 1, and partly broken away.

Figure 4 is a top view of the upper end of the knuckle joint, its anchor pin being shown in dotted lines.

Figure 5 is a bottom view of Figure 4.

Figure 6 is a cross-sectional view of Figure 1, the view being had on the line 6—6 thereof.

Figure 7 is a side view of the piston, and

Figure 8 is a side view of an anchor pin.

Continuing the description in detail and wherein like parts will be indicated by like numerals, and referring to Figures 1 to 3: the lower end of a drill stem is indicated at 1 and is joined to a short cylindrical housing 2 by threads 4. The lower end of this housing is also threaded at 5 as clearly shown in Figures 1 to 3, and treadedly connected thereto is a base member 6, the lower end of the housing 2 having an opening, the walls of which form a continuation of a socket 7. There is also an opening 8 in the end of the base member 6, the purpose of which will be explained hereinafter.

Inside the housing 2, I have arranged a piston 9, a member 10 and a member 11, and these members form an assembly of parts comprising the essential feature of my invention.

The piston 9, also shown in non-assembled position in Figure 7, has its underside formed into a short flat portion 12 and a projecting skirt-like portion 13, and midway of these portions is formed a semi-circular groove 14. Also the piston has a duct 15 for passage of water. The member 10, indicated generally by the arrow, has a projecting lip 15', a semi-circular rib 16 and a lesser or shorter lip 17 and formed integrally therewith is a projecting finger carrying a ball 18. Thus the semi-circular groove 14 of the piston conformably seats over the rib 16, while the flat portion 12 of the piston contacts with the lip 15' and the skirt-like portion 13 contacts with the lesser lip 17. On compression of the piston, this action kicks the ball 18 sidewise. An anchor pin 20 holds the member 10 in position.

The member 11, as will be clearly seen from Figure 1, has in one end a socket 19 in which the ball 18 is seated and supported and one wall of this socket is higher than the other side so as to prevent unseating of the ball when the latter is kicked sidewise. This member 11 is channeled as at 21 and the socket 19 has ducts 22 for passage of water which passes from the chamber A to the ducts thence to channel 21, passing around the anchor pin 23.

The member 11 with its socket 19 has also an enlarged portion 24 and through which the anchor pin 23 passes and this enlargement is semi-circular on two sides 25—25, but flattened on opposite sides 26—26, as will be apparent from Figure 6, the semi-circular sides adapted to rotate smoothly in the socket 7, previously referred to, when the ball 18 is kicked sidewise.

The opening 8, (likewise hereinbefore referred to) together with the semi-circular sides 25—25 of the enlargement 24, serves to permit the movement of member 11 in one direction, while a bumper 28 limits its movement in the opposite direction.

The member 11 is threaded to receive a well fishing tool 29 with a lock nut 30.

From the foregoing it will be apparent that pressure on the piston 9 will force the lip 15' downwardly and this action will kick the ball 18 to the position shown in Figure 2. The ball being disposed in the socket 19, moves the member 11 to an oblique position. To well drillers and those familiar with well drilling, it is understood that sometimes when a rock or other hard substance is reached the drill bit moves to one side of the rock or rocks and cuts a pocket or hole. It is when a tool or cable is lost in one of these pockets that my knuckle joint is most effective, as when the piston moves downwardly and strikes the lip 15' of the member 10, the member 11, carrying a fishing tool is moved over into the pocket and the tool or other object lost can be caught by the fishing tool.

While the drawing and foregoing specification illustrates and describes a practical working embodiment of my invention, I desire it to be understood that modifications and alterations may be made which would not depart from the spirit and intent of my invention and yet remain within the meaning of the claims appended hereto.

What is claimed as new is:

1. A knuckle joint for well fishing tools comprising a housing having a base, a socket formed in the base and the lower end of the housing, a socket member having one end rounded to provide a ball-like formation and said formation comformably seated in the socket, the other end of said socket member projecting below the base and adapted to be connected to a well fishing tool, a piston being reciprocally disposed within said housing, and means co-acting with the piston and said socket member, and wherein said ball-like formation of said socket member has an integrally-formed socket above the ball-like formation, and wherein said piston has a groove in the lower surface thereof; said co-acting means of the piston and socket member comprising a member with a ball on its lower end conformably receivable in said socket of the socket member, and including angularly-disposed lip portions and a rib on its upper end, whereby the rib is receivable in said groove of the piston, and said lip portions co-acting with the under surface of the piston.

2. A knuckle joint for well fishing tools comprising a housing adapted to be secured at one end to a drill stem and having a base with a socket formed therein, a piston disposed in the housing, said piston having its under surface grooved from side to side and having a downwardly projecting skirt-like portion and a flattened portion, a socket member with a ball-like formation on one end with the formation seated in said socket, a socket formed on the upper end of said ball-like formation, and a member co-acting with the lower end of said piston and said socket in the ball-like formation, said co-acting member having a ball on its lower end to seat in said socket, and a relatively long and a short lip on its upper end, the long lip adapted to co-act with the flattened portion of the piston and the shorter lip co-acting with the skirt-like portion thereof, both of said lips being angularly disposed with respect to the axis of the well bore.

GEORGE F. LE BUS.